US010570717B2

(12) United States Patent
Conn et al.

(10) Patent No.: US 10,570,717 B2
(45) Date of Patent: Feb. 25, 2020

(54) CONTROLLING OPERATION OF A STEAM-ASSISTED GRAVITY DRAINAGE OIL WELL SYSTEM UTILIZING CONTINUOUS AND DISCRETE CONTROL PARAMETERS

(71) Applicant: International Business Machines Corporation, Armonk, NY (US)

(72) Inventors: Andrew R. Conn, Mount Vernon, NY (US); Lior Horesh, North Salem, NY (US); Matthias Kormaksson, Rio de Janeiro (BR); Moshood O. Saliu, Calgary (CA); Theodore G. van Kessel, Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 15/276,152

(22) Filed: Sep. 26, 2016

(65) Prior Publication Data

US 2018/0087357 A1    Mar. 29, 2018

(51) Int. Cl.
*E21B 41/00* (2006.01)
*E21B 43/24* (2006.01)
*G05B 13/04* (2006.01)

(52) U.S. Cl.
CPC ...... *E21B 43/2406* (2013.01); *E21B 43/2408* (2013.01); *G05B 13/048* (2013.01)

(58) Field of Classification Search
CPC ............ E21B 43/2406; E21B 43/2408; G05B 13/048
See application file for complete search history.

(56) References Cited

U.S. PATENT DOCUMENTS 6,257,334 B1    7/2001  Cyr et al.
7,879,768 B2    2/2011  Wu
(Continued)

FOREIGN PATENT DOCUMENTS

CN    203905930 U    10/2014
WO    2016025245     2/2016

OTHER PUBLICATIONS

N. Alali et al., "Neural Network Meta-Modeling of Steam Assisted Gravity Drainage Oil Recovery Processes," Iranian Journal of Chemistry & Chemical Engineering, vol. 29, No. 3, Sep. 2010, pp. 109-122.
(Continued)

*Primary Examiner* — Abdelmoniem I Elamin
(74) *Attorney, Agent, or Firm* — Vazken Alexanian; Ryan, Mason & Lewis, LLP

(57) ABSTRACT

A method for controlling operation of a steam-assisted gravity drainage (SAGD) oil well system to increase efficiency in emulsion production includes obtaining a predictive model of the SAGD oil well system. The predictive model has control parameters including one or more continuous control parameters and one or more discrete control parameters. The method also includes utilizing the predictive model to determine values for the control parameters that meet one or more objectives for the SAGD oil well system subject to one or more constraints based on a sequence of iterations of solving a mixed integer non-linear problem. The method further includes adjusting controls of the SAGD oil well system based on the determined values of the control parameters.

20 Claims, 8 Drawing Sheets

(56) References Cited

U.S. PATENT DOCUMENTS

| | | | |
|---|---|---|---|
| 8,146,669 B2 | 4/2012 | Mason | |
| 8,756,019 B2 | 6/2014 | Pimenov et al. | |
| 8,849,639 B2 | 9/2014 | Brown et al. | |
| 8,977,502 B2 | 3/2015 | Liu | |
| 9,043,189 B2 | 5/2015 | Wallace et al. | |
| 9,085,958 B2 | 7/2015 | Laing et al. | |
| 9,163,497 B2 | 10/2015 | Laing et al. | |
| 9,587,480 B2 | 3/2017 | Guerrero et al. | |
| 9,739,125 B2 | 8/2017 | Benson et al. | |
| 9,803,469 B2 | 10/2017 | Kaiser et al. | |
| 9,845,669 B2 | 12/2017 | Miller et al. | |
| 9,964,654 B2 * | 5/2018 | Laake | G01V 1/345 |
| 10,088,596 B2 * | 10/2018 | Maerten | G01V 99/005 |
| 2002/0082815 A1 | 6/2002 | Rey-Fabret et al. | |
| 2006/0095872 A1 | 5/2006 | McElvain et al. | |
| 2007/0055392 A1 | 3/2007 | D'Amato et al. | |
| 2009/0166033 A1 | 7/2009 | Brouwer et al. | |
| 2011/0060572 A1 | 3/2011 | Brown | |
| 2011/0288778 A1 | 11/2011 | Pavlovich et al. | |
| 2011/0320047 A1 | 12/2011 | Stone et al. | |
| 2012/0024524 A1 | 2/2012 | Marsimovich et al. | |
| 2012/0059640 A1 | 3/2012 | Roy et al. | |
| 2013/0105147 A1 | 5/2013 | Scott | |
| 2013/0175030 A1 | 7/2013 | Ige et al. | |
| 2013/0262061 A1 * | 10/2013 | Laake | G01V 1/345 703/6 |
| 2013/0277049 A1 | 10/2013 | Liu | |
| 2014/0124194 A1 | 5/2014 | Jorshari | |
| 2014/0216732 A1 | 8/2014 | Stone et al. | |
| 2014/0216739 A1 | 8/2014 | Brown et al. | |
| 2014/0278302 A1 | 9/2014 | Ziegei et al. | |
| 2014/0352966 A1 | 12/2014 | Yuan | |
| 2015/0009499 A1 | 4/2015 | VanderHeyden et al. | |
| 2015/0114633 A1 | 4/2015 | Godfrey et al. | |
| 2015/0161304 A1 | 6/2015 | Vachon | |
| 2015/0198022 A1 | 7/2015 | Stanecki et al. | |
| 2015/0354336 A1 | 12/2015 | Maurice et al. | |
| 2016/0032692 A1 | 2/2016 | Conn et al. | |
| 2016/0054713 A1 | 2/2016 | Foss et al. | |
| 2016/0098502 A1 | 4/2016 | Havre et al. | |
| 2016/0201453 A1 | 7/2016 | Kaiser et al. | |
| 2016/0245065 A1 | 8/2016 | Gray et al. | |
| 2016/0245071 A1 * | 8/2016 | Vincelette | E21B 43/2406 |
| 2016/0251957 A1 | 9/2016 | Mcewen-king et al. | |
| 2016/0281497 A1 * | 9/2016 | Tilke | E21B 49/00 |
| 2016/0312592 A1 | 10/2016 | Chen et al. | |
| 2016/0312599 A1 | 10/2016 | Adam et al. | |
| 2017/0045055 A1 * | 2/2017 | Hoefel | F04D 1/06 |
| 2017/0051597 A1 | 2/2017 | Akiya et al. | |
| 2017/0177992 A1 | 6/2017 | Klie | |
| 2017/0336811 A1 | 11/2017 | Stone et al. | |
| 2017/0350217 A1 | 12/2017 | Paul et al. | |
| 2017/0351227 A1 | 12/2017 | Paul et al. | |
| 2018/0087371 A1 * | 3/2018 | Vincelette | E21B 43/2406 |
| 2018/0195374 A1 * | 7/2018 | Stalder | E21B 43/2406 |

OTHER PUBLICATIONS

C. Blundell et al., "Weight Uncertainty in Neural Networks," 2015, 10 pages.

N.V. Queipo et al., "Surrogate Modeling-Based Optimization of SAGD Processes," Journal of Petroleum Science and Engineering, Jul. 2002, pp. 83-93, vol. 35, Nos. 1-2.

ip.com, "Methods for SAGD Optimization," IP.com No. IPCOM000213572D, Dec. 21, 2011, 10 pages.

H.X. Nguyen et al., "Experimental Design to Optimize Operating Conditions for SAGD Process," Society of Petroleum Engineers (SPE), SPE Asia Pacific Oil & Gas Conference and Exhibition, SPE 145917, Sep. 2011, 11 pages, Jakarta, Indonesia.

Dennis Denney, "Real-Time Optimization of SAGD Operations," Society of Petroleum Engineers, Journal of Petroleum Technology (JPT), Jun. 2013, pp. 126-128, vol. 65, No. 6.

Shin et al., "Review of Reservoir Parameters to Produce SAGD and Fast-SAGD Operating Conditions," Journal of Canadian Petroleum Technology (JCPT), Jan. 2007, pp. 35-41, vol. 46, No. 1.

English translation for China Application No. CN203905930U.

List of IBM Patents or Patent Applications Treated as Related.

* cited by examiner

100

| WATER REQUIRED | NONLINEAR MODEL WITH DISCRETE PARAMETERS | NONLINEAR MODEL WITHOUT DISCRETE PARAMETERS | LINEAR MODEL WITHOUT DISCRETE PARAMETERS |
|---|---|---|---|
| GOSP1 | 1055.73 | 2974.69 | 3160.71 |
| GOSP2 | 488.95 | 2136.00 | 2534.73 |
| GOSP3 | 951.31 | 2807.38 | 2439.51 |
| GOSP4 | 1915.10 | 4097.32 | 3976.33 |
| GOSP5 | 2434.62 | 4485.57 | 4685.01 |
| TOTAL WATER PRODUCTION | 6,845.73 | 16,500.97 | 17,368.78 |

700

800

CONTROLLING OPERATION OF A STEAM-ASSISTED GRAVITY DRAINAGE OIL WELL SYSTEM UTILIZING CONTINUOUS AND DISCRETE CONTROL PARAMETERS

CROSS-REFERENCE TO RELATED APPLICATIONS

The present application is related to commonly-assigned U.S. patent application Ser. No. 15/276,168, now U.S. Pat. No. 10,276,130, entitled "Controlling Operation of a Steam-Assisted Gravity Drainage Oil Well System by Adjusting Controls to Reduce Model Uncertainty," to commonly-assigned U.S. patent application Ser. No. 15/276,178, entitled "Controlling Operation of a Steam-Assisted Gravity Drainage Oil Well System by Adjusting Multiple Time Step Controls," and to commonly-assigned U.S. patent application Ser. No. 15/276,189, entitled "Controlling Operation of a Steam-Assisted Gravity Drainage Oil Well System by Adjusting Controls Based on Forecast Emulsion Production," which are filed concurrently herewith and incorporated by reference herein.

BACKGROUND

The present application relates to operation, and more specifically, to controlling operation of a steam-assisted gravity drainage (SAGD) oil well system. SAGD is a non-conventional oil production methodology. In a SAGD oil well system, also referred to herein as a SAGD system, steam is injected through one or more injector wells and oil is extracted through one or more producer wells. Generally, injector wells and producer wells are arranged in pairs. A group of such well pairs may be organized as a pad or SAGD production site, such as a pad including six well pairs.

SUMMARY

Embodiments of the invention provide techniques for controlling operation of a SAGD oil well system utilizing continuous and discrete control parameters.

For example, in one embodiment, a method for controlling operation of a SAGD oil well system to increase efficiency in emulsion production comprises obtaining a predictive model of the SAGD oil well system. The predictive model comprises control parameters including one or more continuous control parameters and one or more discrete control parameters. The method also comprises utilizing the predictive model to determine values for the control parameters that meet one or more objectives for the SAGD oil well system subject to one or more constraints based on a sequence of iterations of solving a mixed integer non-linear problem. The method further comprises adjusting controls of the SAGD oil well system based on the determined values of the control parameters. The method is performed by at least one processing device comprising a processor coupled to a memory, the processing device being operatively coupled to the SAGD oil well system.

In another embodiment, a computer program product for controlling operation of a SAGD oil well system to increase efficiency in emulsion production comprises a computer readable storage medium for storing computer readable program code. The computer readable program code, when executed, causes a computer to obtain a predictive model of the SAGD oil well system. The predictive model comprises control parameters including one or more continuous control parameters and one or more discrete control parameters. The computer readable program code, when executed, also causes the computer to utilize the predictive model to determine values for the control parameters that meet one or more objectives for the SAGD oil well system subject to one or more constraints based on a sequence of iterations of solving a mixed integer non-linear problem. The computer readable program code, when executed, further causes the computer to adjust controls of the SAGD oil well system based on the determined values of the control parameters.

In another embodiment, an apparatus for controlling operation of a SAGD oil well system to increase efficiency in emulsion production comprises a memory and a processor coupled to the memory. The processor is configured to obtain a predictive model of the SAGD oil well system. The predictive model comprises control parameters including one or more continuous control parameters and one or more discrete control parameters. The processor is also configured to utilize the predictive model to determine values for the control parameters that meet one or more objectives for the SAGD oil well system subject to one or more constraints based on a sequence of iterations of solving a mixed integer non-linear problem. The processor is further configured to adjust controls of the SAGD oil well system based on the determined values of the control parameters.

DETAILED DESCRIPTION

Figure 1:
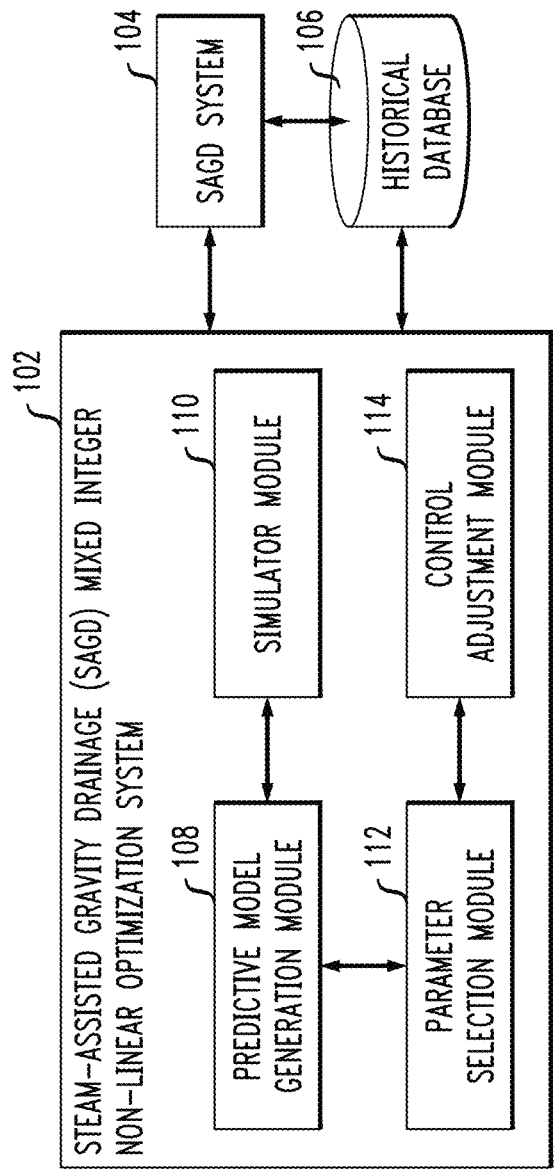
FIG. 1 depicts a system for controlling operation of a SAGD system utilizing continuous and discrete control parameters, according to an embodiment of the present invention.

Illustrative embodiments of the invention may be described herein in the context of illustrative methods, systems and devices for controlling operation of a SAGD oil well system to increase efficiency in emulsion production utilizing continuous and discrete control parameters. However, it is to be understood that embodiments of the invention are not limited to the illustrative methods, systems and devices but instead are more broadly applicable to other suitable methods, systems and devices.

While various illustrative embodiments are described below in the context of a SAGD oil well system, embodiments are not necessarily limited solely to use with SAGD systems. Instead, the techniques described herein may be used for other types of oil production systems and other types of systems that may benefit from the use of continuous and discrete control parameters in physics-based predictive modeling.

SAGD, as mentioned above, is a non-conventional oil production methodology. SAGD refers to a method of extracting bitumen from oil sands. In some arrangements, steam is injected under pressure into one of two parallel horizontal wells, referred to herein as an injector well, to heat the surrounding earth. Heating the earth reduces a viscosity of the bitumen contained in the oil sands, allowing the bitumen to flow under gravity. The bitumen is heated until it flows through porous rock. As an example, it may take a few months to heat the earth to a sufficient temperature, such as 150° C., so that the bitumen will flow under gravity. The flow of bitumen and water condensate is collected and extracted from the other of the two parallel horizontal wells, referred to herein as a producer well. Generally, the producer well is lower or deeper in the earth relative to the injector well. Individual wells, such as the injector and/or producer well, may be slotted and/or valved to facilitate optimal extraction of bitumen from the oil sands.

The two parallel horizontal wells form a well pair. A SAGD production site or pad may include multiple well pairs. For example, a pad may be arranged as a square of concrete with six well pairs. A SAGD system may include multiple pads or production sites, as will be described in further detail below.

The proportion of bitumen in the emulsion for a given SAGD well pair will typically increase over time as the earth is heated. In some cases, a ratio of 2:1 between water and bitumen is considered a good ratio. Various factors may affect the emulsion rate and this ratio, including but not limited to the history of the well, temperature, porosity, the amount of bitumen in the surrounding earth, etc.

Operation of a SAGD system may involve several controls, including but not limited to the rate of steam injected, steam allocation to various sites and/or well pairs, gas casing pressure, extracted emulsion pressure, etc. The SAGD system may be instrumented with a number of sensors that provide at least partial information regarding a state of the SAGD system. Observables which may be measured using such sensors include but are not limited to emulsion rate, temperature profile along the length of a well, sub-cool profile, bottom hole pressure, gas blanket pressure, steam injection surface pressure, etc.

As one non-limiting example, consider a well pair in a SAGD system, wherein the surface pressure injection for the injector well is 2500 kiloPascals (kPa) for the casing and 3200 kPa for the tubing. The pressure will gradually be reduced as a steam chamber develops around the injector well. The bottom hole pressure of the injector well may be, for example, 2700 kPa, while the toe steam pressure in the injector well may by 2600 kPa. For the producer well, the bottom hole pressure may be 2600 kPa, with a tubing heel pressure of 2400 kPa and a tubing toe pressure of 2500 kPa. The surface production pressure, or the extracted emulsion pressure, may be in the range of 400-1000 kPa. The injector and producer wells of a well pair may have a horizontal length in the range of 500 to 1000 meters (m). The vertical distance between the injector and producer well may be approximately 5 m. The oil sands layer may begin 250 to 300 m or more from the surface. For example, a cap rock layer of shale and glacial till may range in thickness above the oil sands layer of the earth. The injector and producer well would thus have a vertical distance from the surface exceeding the thickness of the cap rock layer, which as mentioned above may be in the range of 250 to 300 m.

Costs in a SAGD system may be dominated by the cost of heating the steam relative to the amount of bitumen extracted. Greater steam injection rates generally increase the heat and amount of bitumen recovery, but are subject to constraints and in some cases diminishing returns. Such constraints include but are not limited to the need to keep the pressure in a well below the amount that would cause damage to the well or breach the overburden, avoiding conditions that would ingest steam into a producer well, etc.

A SAGD system may include a field with a number of production sites and many different well pairs. The SAGD system, however, will often have a finite amount of steam to distribute. The decision of how to best distribute the steam to different production sites and well pairs is an optimization problem. In some cases, a brokerage system may be used, where different well pairs or production sites provide estimates of the amount of bitumen that may be extracted day to day and steam is allocated based on such estimates.

A key challenge in SAGD operation is to determine an optimal set of controls that maximize or increase the yield of the system while honoring operational constraints. Maximizing or increasing yield may include maximizing or increasing emulsion rate, minimizing or reducing a cumulative steam to oil ratio in the emulsion, maximizing or increasing a net present value, etc. Operational constraints may include certain upper bounds on pressure such as bottom hole pressure, certain bounds on temperature such as minimum temperatures at different locations along injector and/or producer wells, sub-cool thresholds, etc.

Physics based predictive models may be difficult to generate in a cost-effective manner. For example, each well pair may be subject to different geology and bitumen environments. Thus, a detailed physical model of a well pair may require prescription of model parameters everywhere at all times, leading to great uncertainty. Physics based models may also require the prescription of a large number of "nuisance" parameters, such as porosity, permeability, heat coefficients throughout a field, etc. The nuisance parameters are so named to indicate that they are cost prohibitive or to indicate that there are no definitive means for determining such parameters in a real-world setting. As a consequence, ad-hoc or often generic values may be prescribed.

Such ad-hoc assignment of values may lead to biased predictions, as the values assigned may not properly distinguish the specific characteristics of individual wells, and therefore may fail to provide high fidelity results. In addition, some of the underlying multi-physics phenomena of SAGD systems are not fully realized thus further limiting the effectiveness of physics based predictive models. For example, the underlying physics of a SAGD system is complex, involving heat transfer (diffusion and advection), flow in a porous medium, various chemical processes, etc. Physics based predictive modeling may involve a number of simplifying assumptions that affect the accuracy of results. As an example, some models may treat well pairs as independent although this is not necessarily the case. Consider three well pairs arranged side by side. The left and right well pairs may be subject to more heating loss relative to the center well pair, which is shielded by the left and right well pairs. In addition, thermal communication between well pairs may result from channels through the rock or earth surrounding such well pairs.

Data driven or statistical approaches for modeling SAGD systems also suffer from disadvantages. For example, statistical methods may be agnostic to the underlying physical process, and thus their ability to offer reliable prediction is limited. In particular, as the underlying system is causal, a SAGD system is likely to respond differently to the same set of control inputs at different times. Such system behavior is difficult to model or cannot be modeled reliably, especially when little data is provided or available at an early stage of operation, in situations where values outside a training set are requested, or when long-term prediction is desired. In addition, statistical methods may require significant ramp-up time to accumulate sufficient data for training. Further, models may be tailored such that they are overly specific to one well pair and thus not generalizable to other well pairs.

Due to various limitations of standard predictive models in reliably predicting the response of a SAGD system for an extended duration, some optimization strategies may seek to prescribe a set of controls for optimizing production in just a single unit of time, such as for a single day. The subsurface dynamics of a SAGD system, as described above, may be of a complex multi-physics nature involving diffusion, advection, heat transfer, etc. that span across multi-scale time periods that extend beyond a single time unit such as a day. As such, there can be significant advantages in being able to choose parameters that maximize or increase emulsion production at minimum cost under various constraints that extend beyond a single time unit.

Given various models of a SAGD system, there can be advantages associated with being able to choose parameters including but not limited to steam injection rates, various pressures and topology choices so as to maximize bitumen produced at minimum cost under various constraints. Predictive modeling implemented as simulation of some form may be used in such processes, as certain derivatives associating changes in controls with response of the quantities of interest, such as observables or objectives, may be unavailable. Embodiments provide methods for choosing optimized or improved parameters for a chosen surrogate optimization model of a SAGD system that accommodates both continuous and discrete variables or control parameters. The continuous variables may or may not have derivatives, while the discrete variables (such as a decision whether to turn on or off a well or to open or close a valve, etc.) do not have derivatives.

A mixed integer non-linear optimization framework utilized in some embodiments has two parts. The first part is the predictive model, which aims to predict the state of the SAGD system given a set of controls and knowledge of the current state of the SAGD system. The second part is the optimization, which involves finding a set of controls for which a quantity of interest is optimized or improved while ensuring that the state of the SAGD system is bounded based on operational constraints such as maximum pressures in certain locations, etc. Controls themselves may be bounded via constraints, such as specifying that a heel steam rate does not exceed a prescribed value. Both the objective and the state constraints may be assessed by simulation.

Optimization procedures used in some embodiments employ a simulation process or simulator multiple times to search through the space of feasible sets of controls and states to find a set of controls that maximize or improve a desired objective.

The simulation itself may be performed in two modes. A simulator may communicate closely with the optimization framework and provide derivative information (e.g., how sensitive the objective value and/or constraints are to small changes in controls). Alternatively, black box optimization may be used, which assumes that the simulation process is accessed through function (e.g., objective and constraint) evaluation. In some embodiments, combinations of black box optimization and derivative based simulation may be used.

Constraints of the SAGD system may be associated with state of the SAGD system in addition to or rather than control parameters, and can thus be encoded as non-linear constraints rather than simple bounds. Some simple bounds may be implicit. For example, pressure and steam rates should be nonnegative.

A predictive model simulator of a SAGD system may be used in conjunction with a black box optimizer to prescribe a set of controls to optimize a quantity of interest, such as emulsion flow or production. Emulsion comprises condensate and bitumen, and is produced by a well or group of wells. Controls may include, by way of example, continuous parameters specifying injected steam rates at various sites across the well and discrete parameters specifying whether to open or close valves to turn on or off particular wells.

Such black box approaches, also referred to herein as derivative free optimization, can be used for individual wells or groups of wells. Derivative free optimization may be useful in answering a number of questions, including but not limited to determining whether a quantity of interest is improved by throttling or shutting down one or more wells in a SAGD system. This question can be difficult to answer due to the unavailability of derivatives for certain parameters and the difficulty of approximating derivatives via differencing because of noise levels or simulation tools that do not provide derivatives for the parameters being invoked.

Derivatives, also referred to as adjoints, can be important in optimization, as they allow the utilization of derivative-based optimization approaches such as gradient based methods. Optimization using derivatives can scale to a billion and more decision variables effectively. In comparison, derivative free optimization scales more modestly. For instance, optimizing operations of a SAGD system may involve the use of 100 continuous variables and 20 discrete variables, or more. It is important to note that these numbers are presented by way of example only—modeling a SAGD system may use more or fewer continuous and/or discrete variables.

Using the techniques described herein, the selection of controls for SAGD system may be optimized or improved, such that given input variables a predictive model will return values that correspond to one or more objectives subject to one or more constraints, or more generally the operation of a SAGD system may be controlled to increase the efficiency of emulsion production. Increasing the efficiency of emulsion production may include increasing emulsion output, reducing a water to oil or bitumen ratio of the emulsion, reducing an amount of steam required to achieve a given emulsion output, etc. Increased efficiency of emulsion production may be accounted for in the objectives used, further examples of which are described below. Discrete variables or parameters may be incorporated into a model of the SAGD system as binary variables. A binary variable, for example, may have a value of 0 if the valve, SAGD well pair, SAGD production site, etc. is to be turned off and may have a value of 1 otherwise.

The approaches used in some embodiments are robust for noisy problems. Some calculations, for example computing derivatives via finite differencing, are dependent on having values that are almost noise and/or error free, which may not be the case for real-world SAGD systems. Some embodiments use the techniques described herein to generate optimal or improved parameters of performance in a SAGD system by applying derivative free methods and surrogate models while accounting for sample geometry that is able to handle general constraints and both continuous and discrete variables for the SAGD system.

The term surrogate model refers to an optimization model used by the optimization framework, which may be black box based, derivative based or a combination of black box and derivative based. The role of the surrogate model is to find an optimal set of controls for a given predictive model. The predictive model, as discussed above, describes the response of the SAGD system to a given set of controls.

The surrogate model forms part of a derivative free optimization framework for a SAGD system. The surrogate model used may vary depending on the number of function evaluations that are available, e.g., based on the available computing resources, and the geometry. Different types of surrogate models may be used, including but not limited to undetermined regression, overdetermined regression, interpolation, minimum norm Frobenius models, other types of data fitting models, etc. The sample geometry will also vary. For example, a nonlinear function may be approximated with a quadratic. If selected points lay on a quadratic (or a line) then multiple linearly dependent instances of that quadratic or line can be added to an approximation without changing the value. The surrogate is thus non-unique, which may present a problem. In optimization, for example, one may be headed toward a valley, which could easily put a selected point in an approximate line. This can cause ill-conditioned problems. A number of techniques may be used to fix the geometry of the surrogate model in such instances as will be described in detail below.

FIG. 1 shows a system 100, including a SAGD mixed integer non-linear optimization system 102, SAGD oil well system 104 and historical database 106. Although not explicitly shown, the SAGD mixed integer non-linear optimization system 102, SAGD system 104 and historical database 106 may be connected or operatively coupled to one another possibly via one or more networks. The SAGD mixed integer non-linear optimization system 102 is configured to obtain sensor data from the SAGD system 104 and/or the historical database 106, and utilizes the sensor data in an optimization framework to adjust controls of the SAGD system 104. Details regarding a possible implementation of SAGD system 104 will be discussed in further detail below with respect to FIG. 2.

SAGD mixed integer non-linear optimization system 102 includes predictive model generation module 108, simulator module 110, parameter selection module 112 and control adjustment module 114. The predictive model generation module 108 is configured to generate a predictive model of the SAGD system 104. The simulator module 110 utilizes control parameters from the parameter selection module 112 including one or more continuous control parameters and one or more discrete control parameters to describe the response of the system to such a set of controls for a given state of the system. The simulator module 110 may iterate through the use of various sets of control parameters from the parameter selection module 112 to explore the control space and find a particular set of controls that meets one or more objectives subject to one or more constraints.

The predictive model generation module 108 is configured to generate a simulator for use in the simulator module 110 utilizing historical time series data relating to the SAGD system 104. In some cases, the simulator is generated by calibrating the predictive model utilizing the historical time series data. The historical time series data may be based on time series historical sensor data from different SAGD well pairs in the SAGD system 104. The historical time series data may be obtained directly from sensors in the SAGD system 104, from historical database 106 or some combination of these and other sources. The time series historical sensor data may include but is not limited to steam mass flow, temperature and pressure, emulsion mass flow, etc. The time series historical sensor data may also include data particular to one or both of the injector well and the producer well in a given well pair, such as temperature along the lengths of such wells or at intervals thereof, information such as net injected energy, integrated or current injected energy, net mass flow, integrated or current mass flow, etc. The output of the predictive model generation module 108 may take the form of a data-driven model, a physics based model, a hybrid of the two, etc.

Parameter selection module 112 is configured to utilize output from the simulator module 110 to determine values for the control parameters, both continuous and discrete, that meet one or more objectives for the SAGD oil well system subject to one or more constraints. Control adjustment module 114 utilizes the determined values for the control parameters to adjust controls of the SAGD system 104.

While FIG. 1 shows a system 100 wherein the SAGD mixed integer non-linear optimization system 102 is separate from the SAGD system 104, embodiments are not so limited. In some embodiments, the SAGD mixed integer non-linear optimization optimization system 102 may be incorporated in or otherwise be part of the SAGD system 104. The historical database 106 may also be incorporated at least in part in one or both of the SAGD mixed integer non-linear optimization system 102 and SAGD system 104. Further, while system 100 shows SAGD mixed integer non-linear optimization system 102 connected to a single SAGD system 104, embodiments are not so limited. A single instance of the SAGD mixed integer non-linear optimization system 102 may be connected to or used to adjust controls of multiple distinct SAGD oil well systems in other embodiments. Also, while not explicitly shown in FIG. 1 the SAGD mixed integer non-linear optimization system 102 may be part of a cloud computing environment or other processing platform, as will be discussed in further detail below with respect to FIGS. 8-10.

Figure 2:
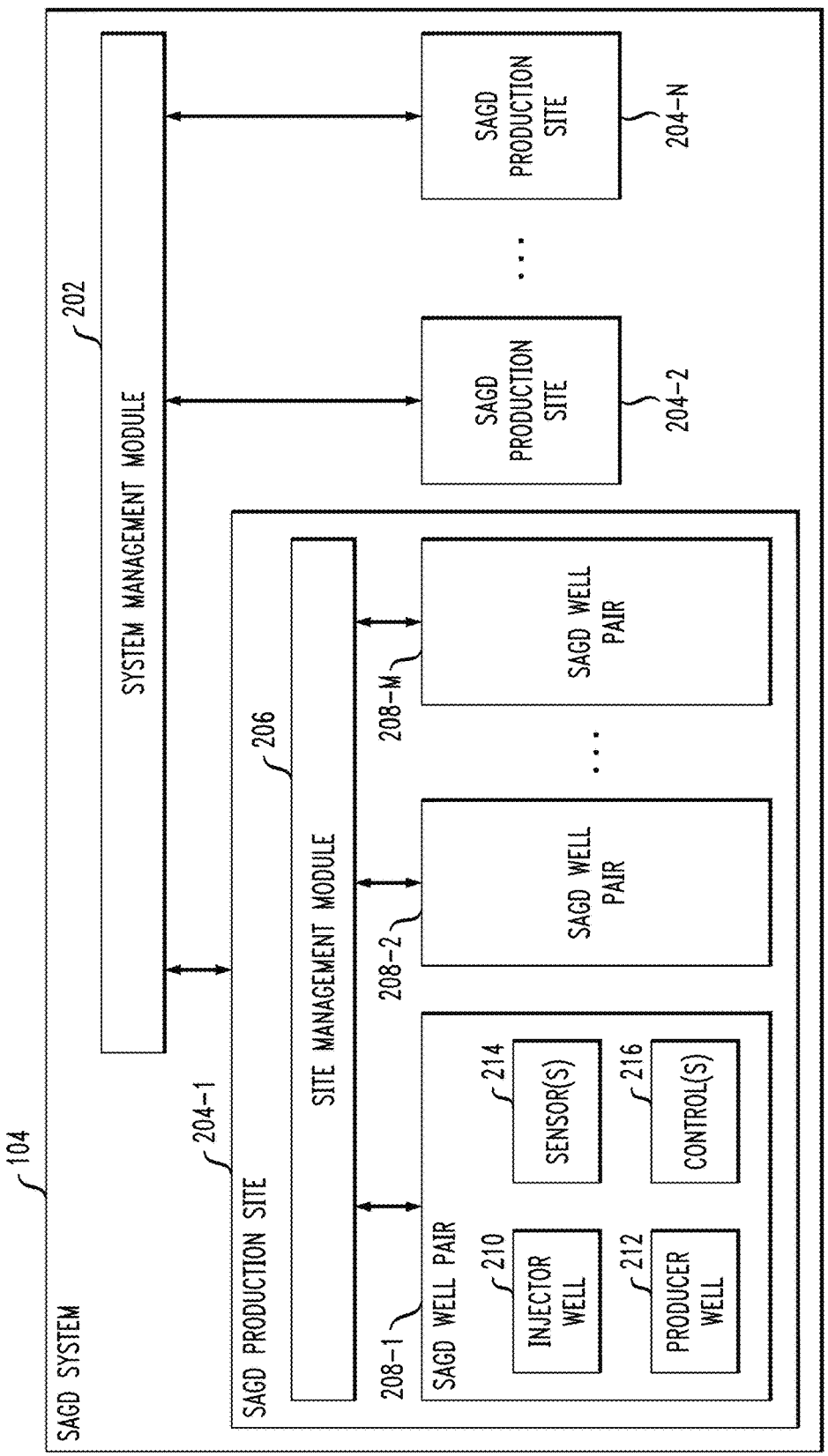
FIG. 2 depicts a detailed view of the SAGD system shown in FIG. 1, according to an embodiment of the present invention.

FIG. 2 shows a detailed view of an illustrative implementation of the SAGD system 104. As shown, the SAGD system 104 includes a system management module 202 and SAGD production sites 204-1, 204-2, . . . 204-N collectively referred to herein as SAGD production sites 204. The system management module 202 may receive control information from the SAGD mixed integer non-linear optimization system 102, and utilize such information to set or adjust various controls at the SAGD production sites 204. Such controls may include, by way of example, steam allocation to different ones of the SAGD production sites 204. In some embodiments, the system management module 202 may incorporate or otherwise provide the functionality of the SAGD mixed integer non-linear optimization system 102.

SAGD production site 204-1 includes a site management module 206 and SAGD well pairs 208-1, 208-2, . . . 208-M collectively referred to herein as SAGD well pairs 208. The site management module 206 may communicate with or receive control information from system management module 202, and utilizes such information to set or adjust controls at respective ones of the SAGD well pairs 208. It is to be appreciated that a particular SAGD system 104 may include only a single SAGD production site, such as SAGD production site 204-1. In these and other cases, the site management module 206 may incorporate or otherwise provide the functionality of the SAGD mixed integer non-linear optimization system 102.

As shown in FIG. 2, SAGD well pair 208-1 includes an injector well 210, a producer well 212, one or more sensors 214 and one or more controls 216. The sensors 214 may be placed at various locations so as to collect information at least partially capturing a state of the SAGD well pair 208-1. Such information may be provided to the site management module 206 and on to system management module 202 for storage in historical database 106 and/or for use in SAGD mixed integer non-linear optimization system 102. Sensors 214 may include temperature sensors, pressure sensors, sub-cool sensors, flow rate sensors, etc. Pressure sensors may take various forms, including bottom hole sensors, surface pressure sensors, blanket gas pressure sensors, etc. Temperature sensors may also take various forms, including thermocouples, fiber optics, distributed temperature systems (DTSs), etc. providing temperature readings across vertical and horizontal sections of a well. A DTS can provide temperature readings at intervals (e.g., one meter) along injector and producer legs of a well pair. Pressure sensors may be fewer in number relative to temperature sensors, and may be located at strategic points to measure observables of interest mentioned above. The relative numbers of temperature and pressure sensors, however, may vary as desired and it is not a requirement that temperature sensors outnumber pressure sensors.

The controls 216 are adjusted based on instructions or information received from the SAGD mixed integer non-linear optimization system 102 via site management module 206 and system management module 202. Controls 216 may include valves to control the flow of steam in injector well 210 or the rate of emulsion flow from producer well 212, the pressure of injected steam, the rate at which emulsion is pumped, the emulsion pressure, the temperature of the injected steam, the allocation of injected steam to different parts of a well (e.g., heel vs. toe), etc. Valves may be manually or automatically actuated in different embodiments.

Although not explicitly shown in FIG. 2, other ones of the well pairs 208 may be configured with an injector well, producer well, sensors and controls in a manner similar to that described above with respect to well pair 208-1. Also, although not explicitly shown in FIG. 2 other ones of the SAGD production sites may be configured with site management modules and SAGD well pairs in a manner similar to that described above with respect to SAGD production site 204-1. Further, while FIG. 2 shows an arrangement in which the SAGD system 104 includes sensors that are local to individual SAGD well pairs, embodiments are not so limited. In some cases, SAGD production site 204-1 may include one or more sensors that collect information common to multiple ones of the SAGD well pairs 208. In a similar manner, the SAGD system 104 may include one or more sensors that collect information common to multiple ones of the SAGD production sites 204.

In some embodiments, physics inspired values are used to express the state of a given one of the SAGD well pairs 208, a given one of the SAGD production sites 204 or the SAGD system 104 at any given time. Such physics inspired values include but are not limited to steam mass flow, temperature and pressure, emulsion mass flow and temperature, temperature along injector and producers legs of a well pair (at intervals thereof or selected regions of interest), net injected energy, integrated energy, net mass, integrated net mass, etc. This information may be used in generating the simulator or black box optimizer of the SAGD system 104, where the simulator or black box optimizer comprises or otherwise utilizes one or more machine learning algorithms including but not limited to autoregressive neural networks. The autoregressive neural network or other model is trained and utilized to predict one or more future states of the SAGD system 104 from historical time series data and a set of control parameters, where the state of the SAGD system 104 is expressed in terms of one or more of the aforementioned variables or other variables described herein.

In some embodiments, methods for choosing optimized parameters in a simulator or black box optimizer of the SAGD system 104 accommodate both continuous and discrete parameters, with and without derivatives respectively. An optimization framework that utilizes the simulator or black box optimizer can determine a set of multiple time step controls, including integer parameters, that optimizes productivity of the SAGD system 104 given some set of objectives or measures of optimality while satisfying multiple time step sets of constraints. The optimization framework, as will be detailed below, may accommodate the absence of derivatives utilizing total black-box optimization.

Figure 3:
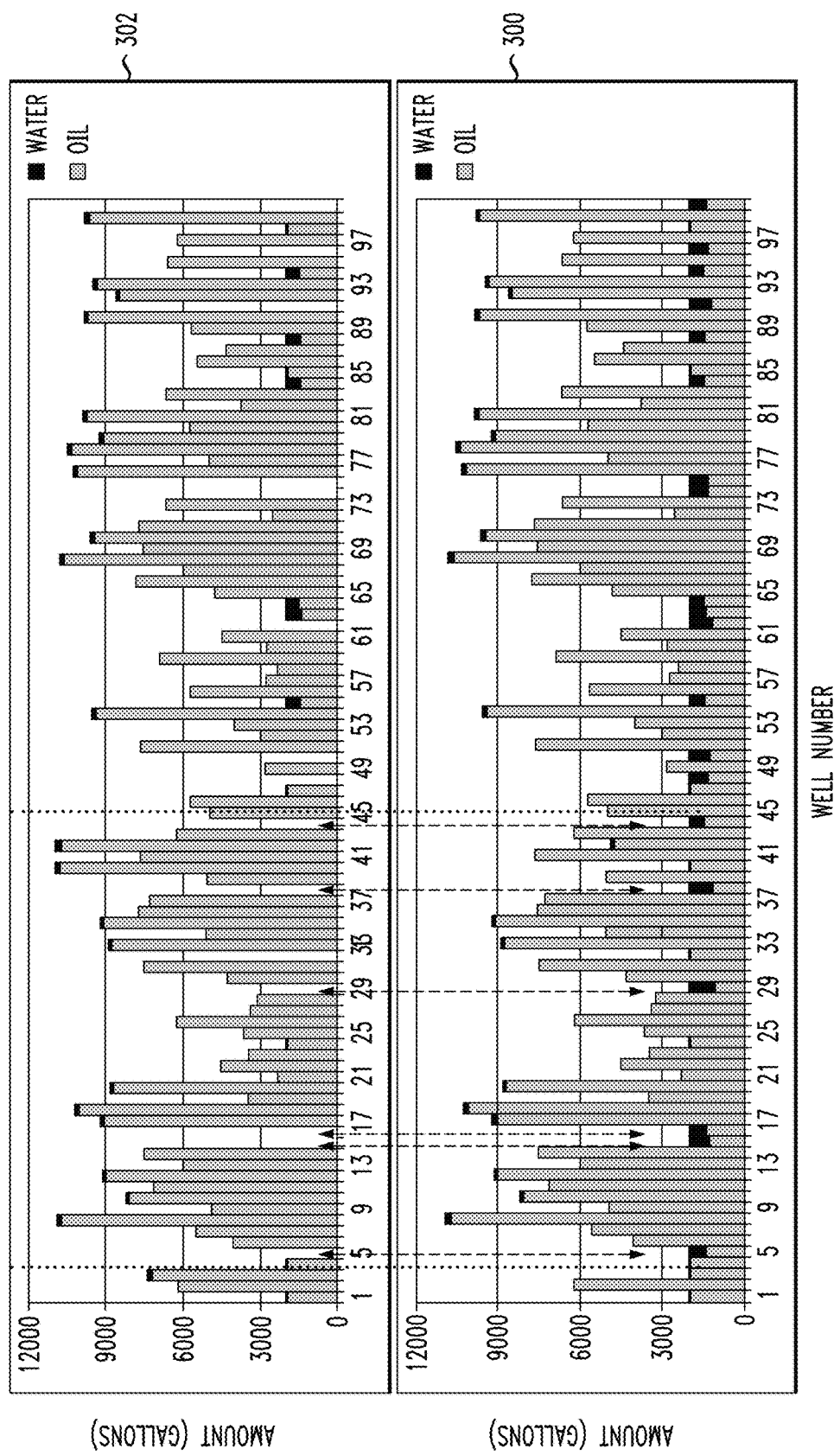
FIG. 3 depicts an optimization of water injection relative to oil production with and without discrete variables, according to an embodiment of the invention.

FIG. 3 illustrates two plots, 300 and 302, showing water injections rates relative to oil production. Plot 300 shows an example without discrete control parameters, while plot 302 shows an example utilizing discrete control parameters. In the plots 300 and 302, the horizontal axis shows water injection and oil production for respective wells in SAGD system 104, while the vertical axis shows volume (in cubic meters). As shown in plot 300, there are some wells that require relatively large amounts of water to produce relatively small amounts of oil. Because discrete control parameters are not used in plot 300, all the wells are turned on and allocated some minimal amount of steam or water (due to certain constraints such as minimum temperatures and pressures at various locations). This can lead to various inefficiencies, as there can be significant setup costs in the form of steam required to obtain even a minimal amount of oil production. Given a finite amount of steam, it may be advantageous to utilize only a subset of the wells available in SAGD system 104. By shutting off certain SAGD well pairs 208 or SAGD production sites 204, as an example, emulsion production may be increased.

Plot 302 shows that using discrete control parameters allows for certain wells in SAGD system 104 to be shut off. As shown in plot 302, certain unproductive wells are shut off compared to the plot 300. There remain certain relatively unproductive wells in the plot 302, due to an upper bound on the number of wells that are allowed to be shut off. The upper bound on the number of wells that can be shut off is an example of a constraint used in the predictive model of the SAGD system 104.

Figures 4, 5:
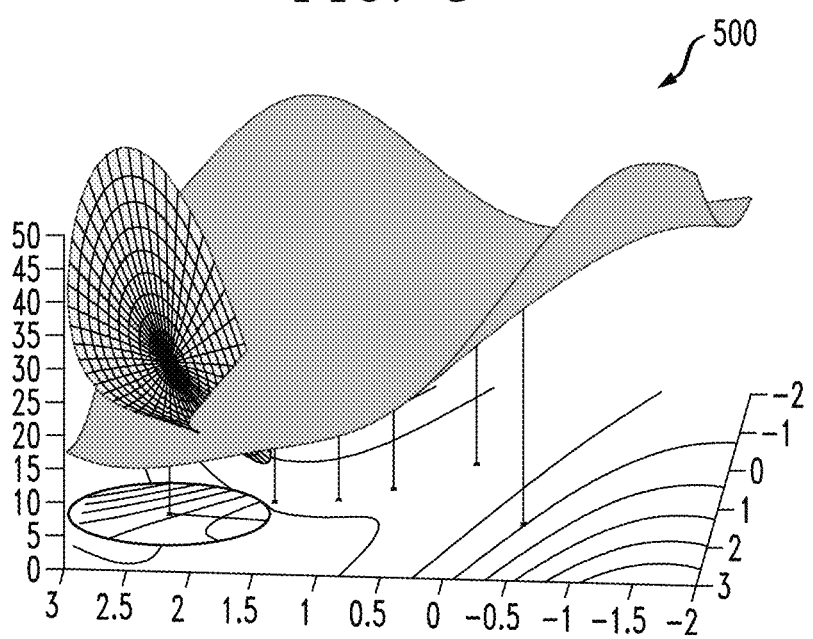
FIG. 4 depicts a table comparing the use of different models for a SAGD system, according to an embodiment of the invention.
FIG. 5 depicts a plot illustrating effects of geometry sampling, according to an embodiment of the invention.

FIG. 4 shows a table 400 comparing the use of different types of predictive models for SAGD system 104. Table 400 shows the water required for different gas oil separation plants (GOSPs) numbered 1 through 5. In SAGD system 104, a GOSP may refer to a particular SAGD well pair 208 or to a particular SAGD production site 204. Table 400 shows an example of the water required with a constraint that total oil production must be 500,000 cubic meters and that for each GOSP, three wells or SAGD well pairs may be turned off. In this particular example, each GOSP is assumed to have 17 wells or SAGD well pairs for a total of 85 SAGD well pairs across the GOSPs 1-5. As illustrated in table 400, the total water production or steam allocated is lowered for a nonlinear model with discrete control parameters relative to the use of a nonlinear model without discrete control parameters and a linear model without discrete control parameters.

FIG. 5 shows a plot 500, which illustrates the effects of geometry sampling. The plot 500 shows a true nonlinear surface in light gray, with a quadratic surrogate model of the true nonlinear surface in dark gray. The quadratic surrogate model is a poor approximation of the true surface, which may result because the sample upon which the surrogate model has been determined has ignored the fact that the points have been chosen based on previous iterative optimization steps, which because of an underlying valley floor have become aligned. Thus, automatically monitoring and rectifying the sample point geometry can be important for optimization. The presence of discrete control parameters without derivatives complicates this process.

In some embodiments, given a suitable predictive model and simulator of the SAGD system 104 the optimization may be carried out using a trust region method. For example, steam allocation in the SAGD system 104 may be formatted as a nonlinear optimization problem with nonlinear inequality constraints. Discrete control parameters, such as whether to operate a SAGD well pair 208 or SAGD production site 204, whether to shut-off particular valves, etc. may be handled using binary (0/1) variables.

Consider, as an example, a predictive model of the SAGD system 104 which uses 100 continuous control parameters and 20 binary or discrete control parameters. In a pad with 20 well pairs, each well pair may be controlled by a set of 5 continuous control parameters—heel steam rate, toe steam rate, heel lift gas flow, toe lift gas flow, and emulsion pressure. In addition, for each well pair there is a binary or discrete control parameter indicating whether the well is active or inactive. Such a configuration enables complete shutdown of wells that are not cost-effective. While it may be expected that an optimization process across the continuous control parameters would figure out the non-effective wells and direct steam rates of zero thereto, in practice operational constraints (e.g., minimum pressures or temperatures) associated with the wells prevents well pairs from being shut down or turned off. The particular numbers given above are presented by way of example only. Each well pair may use more or fewer continuous or discrete parameters in other embodiments.

Various interpolation or regression-based surrogate models of the SAGD system 104 may be used as described above. In some embodiments, the idea is to approximate the objective and constraint functions using function values alone so the geometry of sample points matters. Examples of objective functions include but are not limited to maximization of emulsion flow rate, minimizing steam to oil ratio, maximizing net present value, etc. Constraints may be related to the controls, such as maximum heel or toe steam rate, maximum emulsion pressure, etc. Some constraints may be related to the state of the SAGD system 104, such as maximum surface pressure, maximum bottom hole pressure, minimum sub-cool temperature, maximum variations of temperature across different zones, etc.

The geometry of sample points may affect the optimization. For example, if the surrogate model is a polynomial of order n, the sample points cannot lie on a surface described by a polynomial of order n or below due in part to the uniqueness issue described above. The sample points are input values that are chosen at each iteration, and used to build the surrogate model. The corresponding objective value is used by the algorithm to determine the next choice of sample point modulo having acceptable geometry. If the configuration of the points used in the approximation is ignored, very poor surrogates can be obtained with equally poor optimization (e.g., very slow convergence, stalling, far from optimal results, etc.) Constraints may be handled by an exact penalty function, or may be included explicitly in the surrogate model. Derivatives can be used when available.

In some embodiments, the optimization framework for SAGD system 104 may be formulated by defining the discrete and continuous variables and separating the problem into linear and nonlinear domains for the discrete and continuous control parameters, respectively. Optimization may involve an iterative solution that involves a sequence of solving the discrete (e.g., linear) problem and solving the continuous (e.g., nonlinear) problem. Branch and bound techniques, for example, may be used in this iterative solution.

Described below is an example of an optimization process for SAGD system 104. In this example, optimization requires data curation or systematic transformation and preparation of the operations data and metadata such as emulsion, pressure and temperature profile and steam, etc. Predictive modeling links static data, controls and historic measurements with predicted emulsion and other observables such as temperature, pressure, sub-cool, etc. of SAGD system 104. Various optimization strategies may be used. In some embodiments, model blending may be used. In model blending measured data and functions of the data that have physical significance are input to machine learning algorithms so as to generate a simulator or black box optimizer of the SAGD system 104 that is used in conjunction with a predictive or surrogate model of the SAGD system 104.

Throughout this description, optimization refers to a process of improvement or attempting to meet one or more objectives subject to one or more constraints. Optimization need not necessarily refer to finding the absolute optimal set of discrete and continuous control parameters for SAGD system 104 at any given time. Optimization may instead refer to finding a best option for such control parameters given some finite number of iterations, computing resources or compute time, etc.

Figure 6:
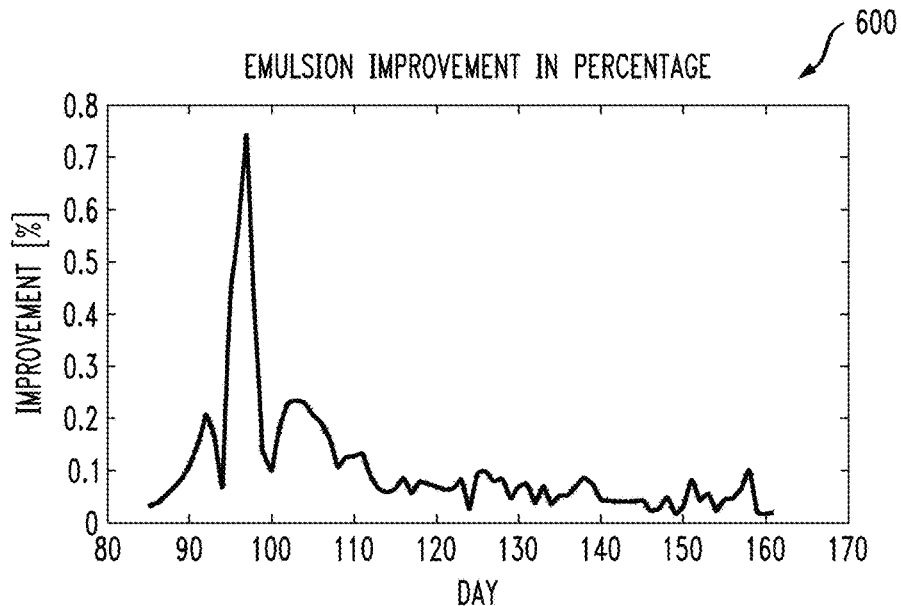
FIG. 6 depicts a plot illustrating improvement in emulsion production utilizing a mixed integer non-linear optimization of the SAGD system, according to an embodiment of the invention.

The state of the SAGD system 104 can evolve over time, and may depend on the cumulative energy and mass inserted to the SAGD system 104. To account for these quantities in addition to raw controls and observables, physical entities including integrated total mass inserted, integrated total energy inserted, mass differential and energy differential may be approximated and fed as input to the predictive model and/or simulator. The integrated total mass inserted is a measure of the integrated amount of steam inserted to the SAGD system 104 over some defined time period. The integrated total energy inserted is a measure which may be computed as the product of the inserted steam multiplied by the computed inwards enthalpy of the steam over some defined time period. The mass differential is a measure of the emulsion flow subtracted from the total injected steam, and the energy differential is a measure of the integrated approximated energy differential over the life of a well, e.g., as a product of the outwards enthalpy of the extracted emulsion subtracted from a product of the inserted mass and the inward enthalpy of the steam. These inputs can be processed using neural network software to produce an executable neural network function for each output variable. In this example there were nine models for each well. These models are then used in an optimization framework to produce estimates of potential improvements in emulsion production. FIG. 6 shows a plot 600 of the improvement in emulsion production (as a percentage) over time.

The predictive model or surrogate model may be used in an optimization framework with a black box optimizer or simulator. The black box optimizer or simulator, as mentioned above, may utilize one or more neural networks. In some embodiments, nonlinear autoregressive exogenous model (NARX) neural networks may be used. In other embodiments, other types of models may be used in the simulator or black box optimizer including models which utilize other types of machine learning, neural networks, feed-forward networks, etc. The simulator or black box optimizer of the SAGD system 104 may be a multiple input-multiple output model. NARX neural networks, for example, may be designed to take multiple inputs and provide multiple outputs. Described below are possible inputs and outputs for the simulator or black box optimizer of the SAGD system 104 which may be used in some embodiments. It is to be appreciated, however, that the inputs and outputs described below are given by way of example only and that other possible inputs and/or outputs may be used in other embodiments.

Model inputs may include, by way of example, heel steam rate, toe steam rate, cumulative injected steam and energy or integrated total mass and total energy inserted (as measured from some defined start time), gas casing pressure, emulsion pressure, mass differential, cumulative mass differential, energy differential and cumulative energy differential.

The heel steam rate and toe steam rate may be associated with a producer well or injector well at a particular SAGD well pair of a SAGD production site. The total steam rate and cumulative injected steam may refer to a SAGD production site, a SAGD well pair at a particular SAGD production site, etc. The gas casing pressure may be with reference to a producer well or injector well at a particular SAGD well pair of a SAGD production site. The emulsion pressure input may be with respect to a producer well at a particular SAGD well pair, or may refer to a group of producer wells at a given SAGD production site or SAGD production sites.

The current mass differential may be measured as a difference between material input at an injector well (e.g., steam) and material output of a producer well (e.g., emulsion) for a particular SAGD well pair at a point in time, or possibly for a group of SAGD well pairs at one or more SAGD production sites at a point in time. The cumulative mass differential or integrated total mass inserted, as described above, may be a measure of the difference between the material input at an injector well (e.g., steam) and the material output of a producer well (e.g., emulsion) for a particular SAGD well pair for a defined time period, or possibly for a group of SAGD well pairs at one or more SAGD production sites for a defined time period. The integrated total energy inserted, as described above, may be a measure of the energy of the material input at an injector well (e.g., steam) for a particular SAGD well pair for a defined time period, or possibly for a group of SAGD well pairs at one or more SAGD production sites for a defined time period.

The energy differential may be a measure of a difference between the energy of material added at an injector well (e.g., the enthalpy of steam added) and material output at a producer well (e.g., the enthalpy of the emulsion) for a particular SAGD well pair at a point in time, or possibly for a group of SAGD well pairs at one or more SAGD production sites at a point in time. The cumulative energy differential may be a measure of the difference between the energy of material added at an injector well (e.g., the enthalpy of steam added) and the energy of material output at a producer well (e.g., the enthalpy of the emulsion) for a particular SAGD well pair for a defined time period, or possibly for a group of SAGD well pairs at one or more SAGD production sites for a defined time period.

Model outputs may include, by way of example, emulsion rate, blanket gas pressure, temperature zone 1 A, temperature zone 1 B, temperature zone 2 A, temperature zone 2 B, sub-cool, heel steam pressure and toe steam pressure. The emulsion rate may be an output rate for a particular SAGD well pair, for a group of SAGD well pairs at one or more SAGD production sites, etc. The blanket gas pressure may be for an injector well of a particular SAGD well pair.

The outputs relating to temperature are divided into zones 1 and 2, and further into outputs A and B. Zones 1 and 2 may refer to temperature readings at particular points in a SAGD production site, a particular SAGD well pair, along the length of an injector well or producer well of a particular SAGD well pair, etc. Zones 1 and 2 may also utilize multiple temperature readings for a section or portion of the injector well or producer well of a particular SAGD well pair, or for particular sections or portions of a SAGD well pair or SAGD production site, etc. The values A and B may indicate different values for the respective zones. For example, the values A and B may indicate maximum and minimum temperatures, respectively, or the mean temperature and deviation, respectively, etc. At a given SAGD well pair, or SAGD production site, there may be hundreds or thousands of temperature measurements taken at different locations. The number of outputs relating to temperature may vary as desired for a particular implementation, such as using one zone or more than two zones. In a similar manner, the numbers of other inputs and outputs used may vary, such as for example using multiple different pressure readings for different zones or locations, etc.

The sub-cool output may be measured for a particular SAGD well pair, for a group of two or more SAGD well pairs at one or more SAGD production sites, etc. Temperature and pressure readings may be used to compute enthalpy of the output of a producer well to determine if the emulsion output is in a gas or liquid phase. The sub-cool level or threshold gives a degree or margin to prevent ingestion of steam into the producer well. Negative sub-cool refers to a situation in which the enthalpy of the emulsion is less than the enthalpy of steam, and has adverse effects such as the ingestion of sand or gravel into the producer well. A sub-cool level or threshold may be set to 10% or more in some embodiments, but is more generally set so as to obtain as much bitumen in the emulsion output without ingesting sand, gravel or other undesirable particulates into the producer well.

Heel and toe steam pressure outputs may be measured for a producer well at a particular SAGD well pair.

The simulator or black box optimizer of the SAGD system 104 may be used in conjunction with the predictive model or surrogate to optimize, improve or otherwise meet one or more objectives subject to one or more constraints. Objectives may include but are not limited to increasing or maximizing emulsion production, decreasing or minimizing a steam to oil ratio, increasing or maximizing a net present value, etc. An objective may also be framed in the context of a constraint, such as meeting a threshold oil or emulsion production using as little steam as possible. In the example below, the objective is to maximize or increase the emulsion rate.

Constraints may include but are not limited to various pressure and temperature maximums and minimums at various locations in the SAGD system 104, threshold sub-cool levels, etc. Constraints may take various forms, such as non-linear inequality constraints, bound constraints, etc. In the example below, the non-linear inequality constraints include:

0≤injector BHP (or blanket gas pressure)≤1740 kPa gauge
min(temperature)≥45° Celsius (C)
std(temperature$^{zone}$)≤15° C.
mean(sub-cool)≥5° C.

The min(temperature) constraint may refer to the minimum temperature of a particular well section or sections. Each well in a well pair may be divided into two main sections—a vertical length and a horizontal length. Each section may be further subdivided into zones as described above. Temperature may be measured along the well in each of the zones. Sub-cool temperature measurements may also be taken across zones of the horizontal section of the producer well. The sub-cool measurement, as described above, involves the difference between the producer bottom hole temperature and the saturated steam temperature at the injector bottom hole pressure. The temperature$^{zone}$ constraint may refer to the temperature at an injector well or producer well for some defined length, and std( ) refers to standard deviation. The temperature uniformity across horizontal zonal length (e.g., for a particular portion of an injector or producer well) may also or alternatively be incorporated as a regularizer. The sub-cool constraint may be in the form of a mean or average, and sets the threshold sub-cool level.

In the example below, the bound constraints include:

0≤steam injection surface pressure≤3900 kPa gauge
max($c_{hsr}^{lb}$, 0)≤heel steam rate≤max($c_{hsr}^{ub}$, 0)
max($c_{tsr}^{lb}$, 0)≤toe steam rate≤max($c_{tsr}^{ub}$, 0)
max($c_{cgp}^{lb}$, 0)≤casing gas pressure≤max($c_{cgp}^{ub}$, 0)
max($c_{ep}^{lb}$, 0)≤emulsion presusure≤max($c_{ep}^{ub}$, 0)

$c_{hsr}^{lb}$ is the minimum or lower bound of the historical heel steam rate, $c_{hsr}^{ub}$ is the maximum or upper bound of the historical heel steam rate, $c_{tsr}^{lb}$ is the minimum or lower bound of the historical toe steam rate, $c_{tsr}^{ub}$ is the maximum or upper bound of the historical toe steam rate, $c_{cgp}^{lb}$ is the minimum or lower bound of the historical casing gas pressure, $c_{cgp}^{ub}$ is the maximum or upper bound of the historical casing gas pressure, $c_{ep}^{lb}$ is the minimum or lower bound of the historical emulsion pressure, and $c_{ep}^{ub}$ is the maximum or upper bound of the historical emulsion pressure.

It is to be appreciated that the specific values and numbers used in the above-described constraints are presented by way of example only, and that embodiments are not limited solely to use with the specific numbers and/or ranges given or to use with the specific example constraints described.

The control variables in the example below include continuous and discrete variables. The continuous variables include heel steam rate, toe steam rate, heel lift gas flow, toe lift gas flow and emulsion pressure. The discrete variables are binary on/off decisions concerning well choices and whether to open valves.

It is to be appreciated that while various examples of objectives, constraints and controls are described above and used in the example below, embodiments are not limited solely to use with these specific objectives, constraints and controls.

Derivative free optimization may provide a number of advantages. Derivative free optimization, for example, can be used to handle so-called black box problems, or a view of the SAGD system 104 in terms of its inputs and outputs without requiring knowledge of the internal workings of the SAGD system 104. In a black box problem, a user can give input variables and after some time a result is returned that is the corresponding objective and constraint values. Black box problems may be relatively expensive to evaluate—for example, given the complexity involved a function evaluation may take several hours of simulation using readily available computing resources. Simulation using black box techniques is inherently noisy and contains unknown errors or model misspecification. Embodiments advantageously accommodate such noise and unknown error, which is useful in considering SAGD system 104 with its complex multi-physics nature.

Derivative free optimization can also handle discrete variables or control parameters. In the SAGD system 104, for example, there may be various valves, injector wells, producer wells, SAGD well pairs 208, SAGD production sites 204, etc. that can be shut down or turned off. These may be included in the predictive model of the SAGD system 104 as binary variables where a 0 value represents turning off or shutting down and a 1 value represents turning on or running (or vice versa). Derivative free optimization is also robust in the face of noisy problems. In noisy problems such as in modeling SAGD system 104, it can be difficult, computationally expensive or otherwise impractical to calculate derivatives via finite differencing. In addition, reliable calculation of derivatives via finite differencing may be dependent on having values that are substantially noise and error free, which may not be the case for SAGD system 104. Derivative free optimization is also a general and flexible framework, as it may be black box based.

In mixed integer non-linear optimization of the SAGD system 104, there are a limited number of control parameters. In some embodiments, there are 100 continuous and 20 discrete control parameters. As described above, continuous control parameters include toe steam rate, heel steam rate, casing gas pressure and emulsion pressure. The particular numbers and types of control parameters used to model a SAGD system, however, may vary as desired for a particular application and thus it is not a requirement that mixed integer non-linear optimization use 100 continuous and 20 discrete control parameters. Surrogate models for the SAGD system 104 that are interpolation or regression based may be used in the derivative free optimization. In some cases, the idea is to approximate objective and constraint functions using function values alone.

The geometry of sample points may be an important consideration in derivative free optimization. For example, if the configuration of points used in the approximation is ignored, poor surrogates with poor optimization (e.g., slow convergence, stalling, non-optimal results, etc.) may result.

Constraints in derivative free optimization may be handled using an exact penalty function. For example, in maximizing emulsion rate, a weighted combination of the constraint violations may be added to the objective function so as the weights increase the result is encouraged to be feasible.

An example algorithm for derivative free optimization is now described. Historical time series data is used to build the simulator. The simulator, as mentioned above, may include or otherwise utilize neural networks or other machine learning algorithms. To begin, a relatively poor optimization surrogate model may be used, based on three sample points and a best linear approximation. Given an initial region of interest, the constrained problem based on the relatively poor optimization surrogate model may be solved for that region using the simulator. This results in a new point and corresponding black box values for the objective and constraints. The initial region of interest may, in some instances, be fairly arbitrary—with the caveat that it is desirable to incorporate reasonable scaling. The surrogate is optimized in the region of interest, which can be a relatively simple task. Depending on the result for the true function compared with that of the surrogate within the current region of interest the size of this region is automatically adjusted by the algorithm. The sample points determine the surrogate function.

The progress of optimization or improvement may be assessed by comparing the black box values with those predicted by the predictive model of the SAGD system 104. If the comparison is satisfactory, the new value is accepted and the size of the region of interest may be increased. If the comparison is unsatisfactory, a determination is made as to whether this is due to an inadequate surrogate model. Control of the sample points used is thus important. If the surrogate model is determined to be inadequate, the size of the region of interest may be reduced and/or the surrogate model may be updated and the constrained problem may be solved using the reduced size region of interest and/or updated surrogate model.

In some embodiments, the highest order predictive models used are quadratic models. A single quadratic interpolation in 10 continuous points may require 66 black box function evaluations. For binary variables y^2=y so some quadratic terms are omitted. As such, it can be important to be parsimonious and iterative in evaluation. For example, only one new evaluation may be done per iteration and convergence from start to finish may take about 100 evaluations to conserve computing resources.

In some embodiments, a search in the solution space of possible control parameters for SAGD system 104 is performed using mixed integer non-linear optimization including a series of iterations of relaxation, optimization surrogate formulations, relaxed feasible solution initializations, discrete search and solving a surrogate nonlinear programming problem. These steps will be described in detail below.

For relaxation, the discrete variables or discrete control parameters are relaxed such that they are treated as continuous. A non-linear optimization problem is then formed that incorporates the relaxed discrete control parameters. Next a surrogate optimization model is built. Building the surrogate model may itself include a number of iterations. The surrogate model is suitable for enabling a rapid estimation of optimum or improved control parameters for SAGD system 104.

The surrogate model may be formed using various techniques. In some embodiments, the surrogate model is formed based on curvature information obtained from the predictive model of the SAGD system 104 when the predictive model of the SAGD system 104 is differentiable with respect to the control parameters. The curvature information may be obtained from the predictive model of the SAGD system 104 using, for example, low rank gradient based estimates for Hessians incorporated into quasi-Newton like methods. In other embodiments, function values such as those obtained using black box optimizers may be used to form the surrogate model. It is important to note that combinations of such techniques (e.g., combinations of gradient based optimization and black box optimization) may be used in forming the surrogate model in some embodiments.

As described elsewhere herein, in situations wherein the underlying predictive model of the SAGD system 104 is not differentiable or where derivatives are not accessible or difficult to obtain, the surrogate model may be based on function evaluation or simulation output alone. This may be the case, for example, wherein the predictive model of the SAGD system 104 is a data-driven model. A surrogate model that is based upon function evaluations at different sample points (e.g., sample values for control parameters) may be monitored to determine the geometric suitability of the sample points.

Relaxed feasible solution proposition, in some embodiments, involves finding the approximate optimal value of the surrogate model within a specified level of confidence in a trust region neighborhood of the current best surrogate model input parameters. The optimal value or values of the surrogate model, for example, may be for quantities of interest in the SAGD system 104 such as emulsion production. The relaxed feasible solution proposition seeks to find the approximate optimal value of the surrogate model while accounting for the feasible region as defined by the constraints on the SAGD system 104, using techniques such as projections, active set, augmented penalty functions, etc. The relaxed feasible solution proposition itself may involve a number of iterations.

In discrete search, integer programming techniques are applied to account for the discrete nature of the discrete control parameters and to explore improved values for the discrete control parameters. Integer programming techniques which may be used in some embodiments include but are not limited to outer approximation, branch and bound, feasibility pumps and cuts, etc.

Solving the surrogate nonlinear programming problem involves solving the above-referenced non-linear optimization problem that was formed by relaxing the discrete control parameters as continuous variables, though now the discrete control parameters are kept fixed at the locally determined optimal values based on the discrete search and a non-linear solution for the continuous control parameters is found. Solving the non-linear problem may involve use of the surrogate model but without relaxation of the discrete control parameters. In some embodiments, the surrogate nonlinear programming problem is posed as a quadratic. Depending on the success of an iteration, as measured by the predictive model of the SAGD system 104, a mixed integer quadratic is solved with the discrete variables free.

The above-described procedure for searching the control space may be repeated until convergence upon a feasible solution of the mixed integer non-linear problem is achieved. Once a solution is found, actuators in the SAGD system 104 for the controls are adjusted and the SAGD system 104 evolves. In some embodiments, the performance relies upon the fidelity of the underlying predictive model of the SAGD system 104 and its derivatives with respect to the continuous control parameters (if available) and the veracity of the surrogate model otherwise.

Figure 7:
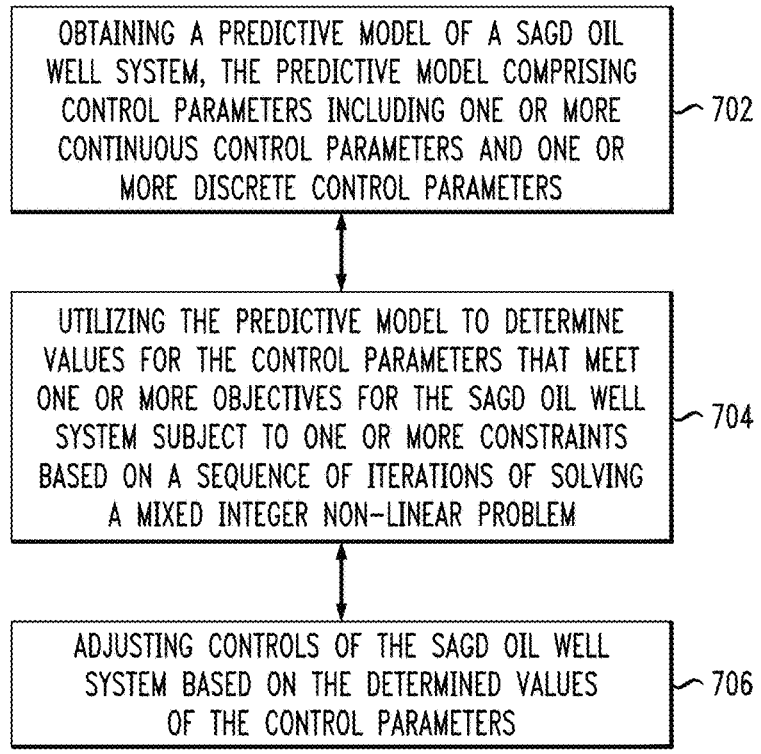
FIG. 7 depicts a process for controlling operation of a SAGD system utilizing continuous and discrete control parameters, according to an embodiment of the invention.

FIG. 7 shows a process 700 for controlling operation of a SAGD oil well system such as SAGD system 104. SAGD mixed integer non-linear optimization system 102 may be used to implement process 700. The process 700 begins with step 702, obtaining a predictive model of the SAGD system 104, where the predictive model comprises control parameters including one or more continuous control parameters and one or more discrete control parameters. In some embodiments, step 702 obtains the predictive model of the SAGD system 104 by generating the predictive model of the SAGD system 104 and calibrating the predictive model utilizing historical time series data relating to one or more SAGD oil wells at one or more SAGD production sites of the SAGD oil well system, where the historical time series data being obtained from a plurality of sensors in the SAGD oil well system.

The historical time series data may be obtained at least in part from a plurality of sensors in the SAGD system, such as the sensors 214 in SAGD well pair 208-1. The historical time series data may, in some embodiments, include 2-5 days of historical data relating to one or more SAGD oil wells in the SAGD system 104. In other embodiments, more or less than 2 to 5 days of historical time series data may be used. In some embodiments, calibrating the predictive model of the SAGD system 104 utilizing the historical time series data comprises generating a simulator of the SAGD system 104, which may be a NARX neural network, another type of machine learning algorithm or neural network, or another type of black box optimization.

The discrete control parameters or variables for SAGD system 104 may include a number of binary variables. The binary variables may specify, at a given time, whether to shut down a particular SAGD oil well, also referred to herein as a SAGD well pair, or whether to shut down a SAGD production site comprising multiple SAGD well pairs. The binary variables may also or alternatively specify whether to open or close particular valves at one or more SAGD well pairs that control the allocation of steam to an injector well or portions thereof.

In some embodiments, the discrete control parameters comprise a set of control variables specifying whether to turn on or shut down each of the SAGD oil wells in the SAGD system 104. In some embodiments, constraints utilized in step 704 described below specify an upper bound on a number of SAGD oil wells that can be shut down in the SAGD oil well system at a given time, or a number of SAGD oil wells that can be shut down in a particular SAGD production site at the given time. There may be different bounds set for different SAGD production sites. For example, in SAGD production sites with larger numbers of SAGD well pairs, it may be permissible to shut down more SAGD well pairs relative to a SAGD production sites with smaller numbers of SAGD well pairs. The continuous control parameters may include, for each SAGD oil well or SAGD well pair that is turned on, a rate of steam to allocate to that SAGD oil well or SAGD well pair.

The continuous control parameters, in some embodiments, include a heel steam rate at a given injector well at a given SAGD oil well, a toe steam rate at the given injector well, a heel lift gas flow at the given injector well, a toe lift gas flow at the given injector well, and/or an emulsion pressure at a given producer well at the given SAGD oil well. The one or more constraints used in step 806 may include a lower bound and an upper bound for a steam injection surface pressure for the given injector well, a lower bound and an upper bound for the heel steam rate based on historical heel steam rates for the given injector well, a lower bound and an upper bound for the toe steam rate based on historical toe steam rates for the given injector well, a lower bound and an upper bound for casing gas pressure at the given SAGD oil well based on historical casing gas pressure for the given SAGD oil well and/or a lower bound and an upper bound for emulsion pressure at the given producer well based on historical emulsion pressure at the given producer well. The one or more constraints used in step 704 described below may further or alternatively include at least one threshold pressure associated with the given SAGD oil well, at least one threshold temperature associated with the given SAGD oil well and/or a threshold sub-cool level associated with the given SAGD oil well.

In step 704, the predictive model is utilized to determine values for the control parameters that meet one or more objectives for the SAGD system 104 subject to one or more constraints based on a sequence of iterations of solving a mixed integer non-linear problem. Controls of the SAGD system 104 are adjusted in step 706 based on the values for the control parameters determined in step 704. In some embodiments, determining values for the control parameters comprises identifying values for the control parameters that improve the one or more objectives for the SAGD system 104 while maintaining specified bounds on observables and the controls of the SAGD system 104. Relationships between the one or more objectives and the controls of the SAGD system 104, as well as relationships between the one or more constraints on the observables and the controls of the SAGD system 104, may be non-linear.

In some embodiments, the sequence of iterations in step 704 includes searching a solution space of a mixed integer non-linear problem comprising, in each iteration relaxation of the discrete control parameters as continuous variables and forming a first non-linear optimization problem incorporating the relaxed discrete control parameters, building a surrogate model of the SAGD system 104 based on the first non-linear optimization problem, finding optimal values for the surrogate model within a trust region of the surrogate model while accounting for the one or more constraints on the SAGD system 104, applying a discrete search utilizing integer programming to identify values for the discrete control parameters, and utilizing non-linear programming to identify values for the control parameters utilizing the first non-linear optimization problem wherein values for the discrete control parameters are kept fixed at the values identified by applying the discrete search.

Building the surrogate model may include forming the surrogate model based on upon curvature information where the predictive model is differentiable with respect to the control parameters and based on function values where the predictive model is not differentiable. Building the surrogate model may also or alternatively include forming the surrogate model based on one or more function evaluations at sample points representing values for the control parameters while monitoring the geometric suitability of the sample points. The one or more function evaluations may be performed using a black box optimizer comprising a nonlinear autoregressive neural network trained using historical time series data for the SAGD system 104 obtained from a plurality of sensors in the SAGD system 104.

Applying the discrete search utilizing the integer programming may include utilizing one or more of outer approximation, branch and bound and feasibility pumps and cut to explore improved values for the discrete control parameters. Identifying values for the continuous control parameters utilizing the non-linear programming may include solving a surrogate nonlinear programming problem posed as a quadratic.

In some embodiments, step 704 includes utilizing a branch and bound algorithm for determining values of the continuous control parameters and the discrete control parameters in a sequence of iterations of solving a discrete problem to obtain values for the discrete control parameters and solving a continuous problem to obtain values for the continuous control parameters.

Step 704 in some embodiments may include generating a surrogate model of the SAGD oil well system based on interpolation or regression of results of simulation, e.g., the neural network, and approximating objective and constraint functions using function values in a black box optimization.

The one or more constraints may be incorporated into the objective function using an exact penalty function comprising a weighted combination of constraint violations. Step 804 may also or alternatively include generating a linear approximation of emulsion production at a given one of the SAGD oil wells based on simulation results obtained using the simulator, selecting a region of interest in a space of values for the control variables, solving a constrained problem based on the linear approximation to generate an additional sample point for emulsion production, and increasing or decreasing the selected region of interest based on refining the predictive model utilizing the additional sample point.

The one or more objectives used in step 704 may include, by way of example, increasing emulsion production, decreasing a steam to oil ratio, increasing net present value, etc. Other embodiments may utilize other objectives, including combinations of two or more of these and other objectives. As an example, another objective may be to reduce the amount of steam utilized in the SAGD system 104 while maintaining a threshold emulsion production in the SAGD system 104.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
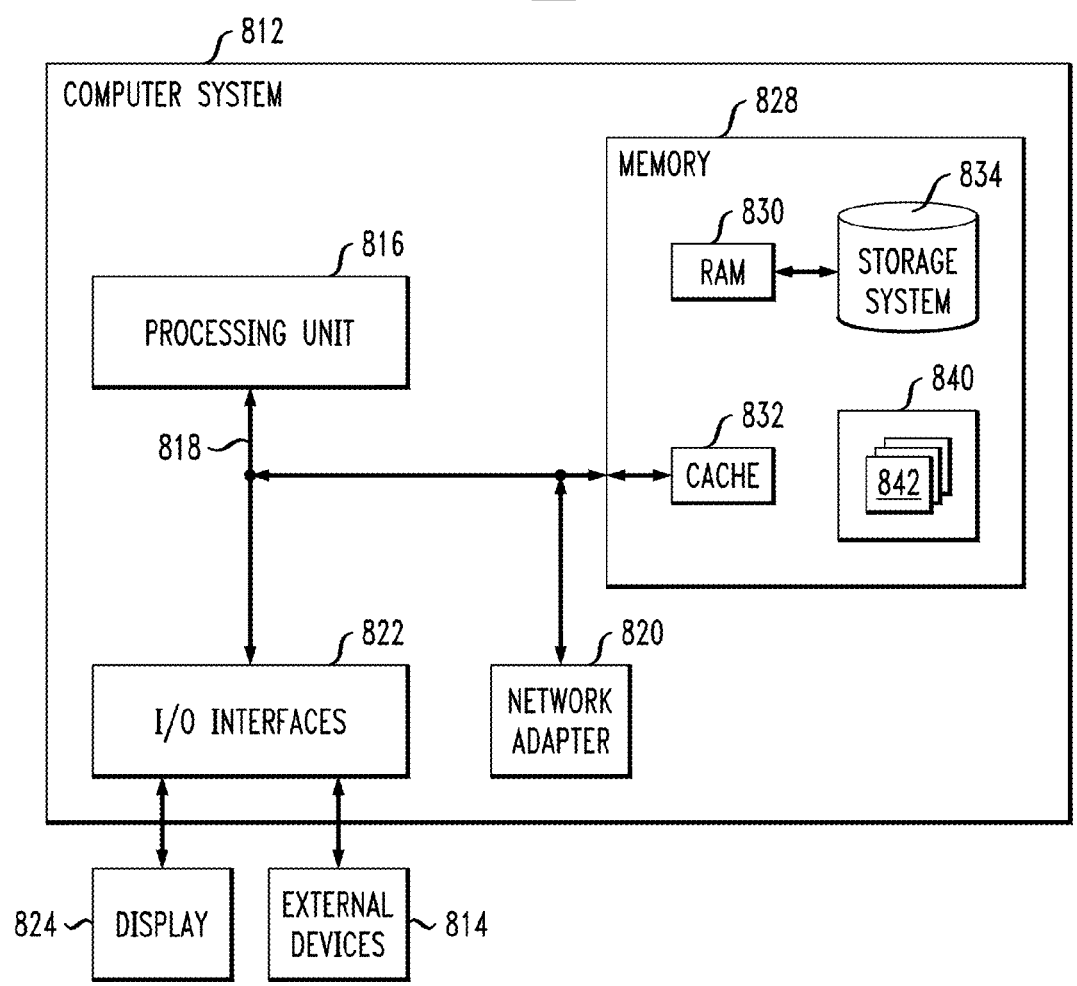
FIG. 8 depicts a computer system in accordance with which one or more components/steps of techniques of the invention may be implemented, according to an embodiment of the invention.

One or more embodiments can make use of software running on a general-purpose computer or workstation. With reference to FIG. 8, in a computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

The bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 812 typically includes a variety of computer system readable media. Such media may be any available media that is accessible by computer system/server 812, and it includes both volatile and non-volatile media, removable and non-removable media.

The system memory 828 can include computer system readable media in the form of volatile memory, such as random access memory (RAM) 830 and/or cache memory 832. The computer system/server 812 may further include other removable/non-removable, volatile/nonvolatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 818 by one or more data media interfaces. As depicted and described herein, the memory 828 may include at least one program product having a set (e.g., at least one) of program modules that are configured to carry out the functions of embodiments of the invention. A program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc., one or more devices that enable a user to interact with computer system/server 812, and/or any devices (e.g., network card, modem, etc.) that enable computer system/server 812 to communicate with one or more other computing devices. Such communication can occur via I/O interfaces 822. Still yet, computer system/server 812 can communicate with one or more networks such as a LAN, a general WAN, and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
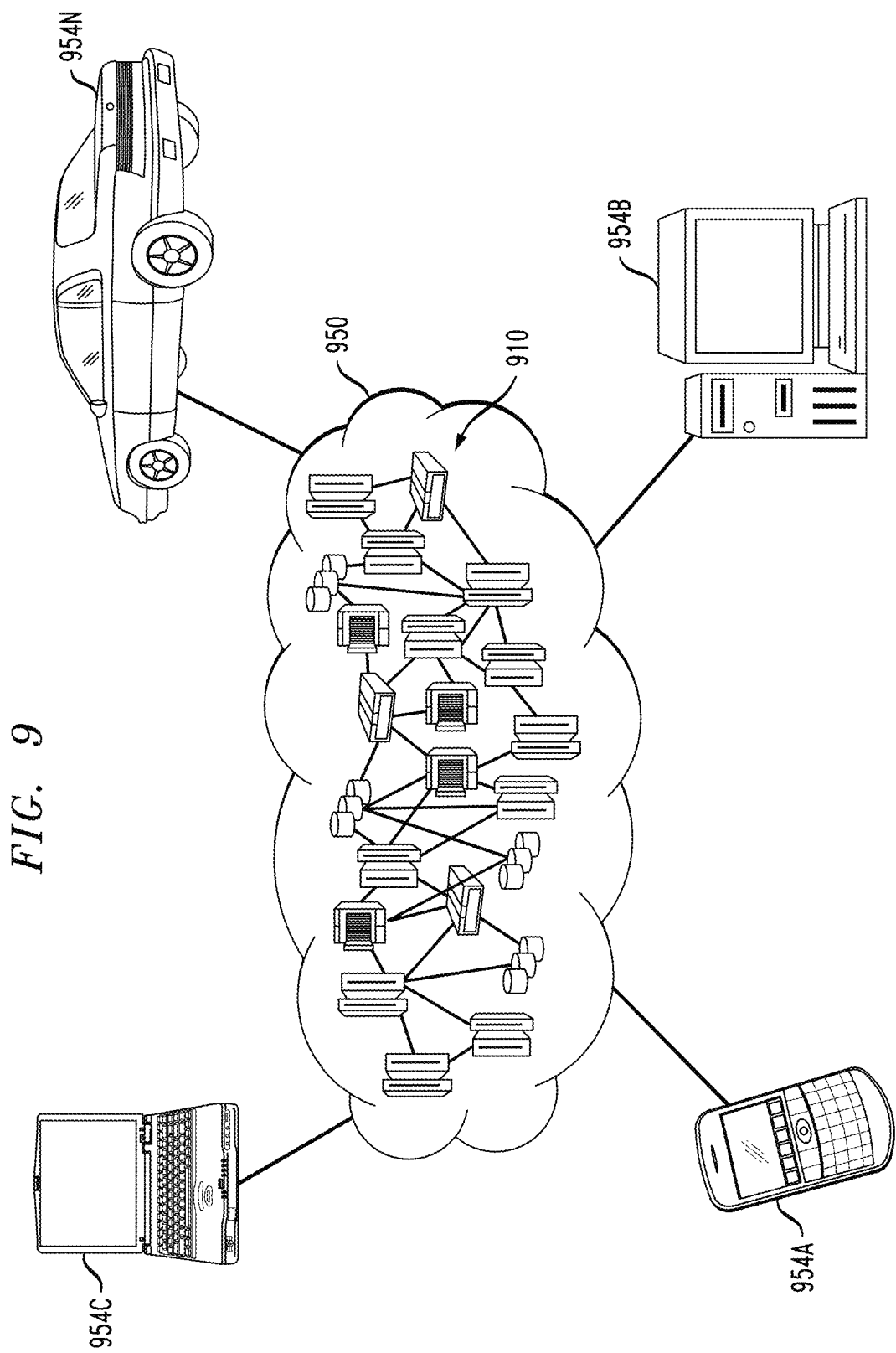
FIG. 9 depicts a cloud computing environment, according to an embodiment of the present invention.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
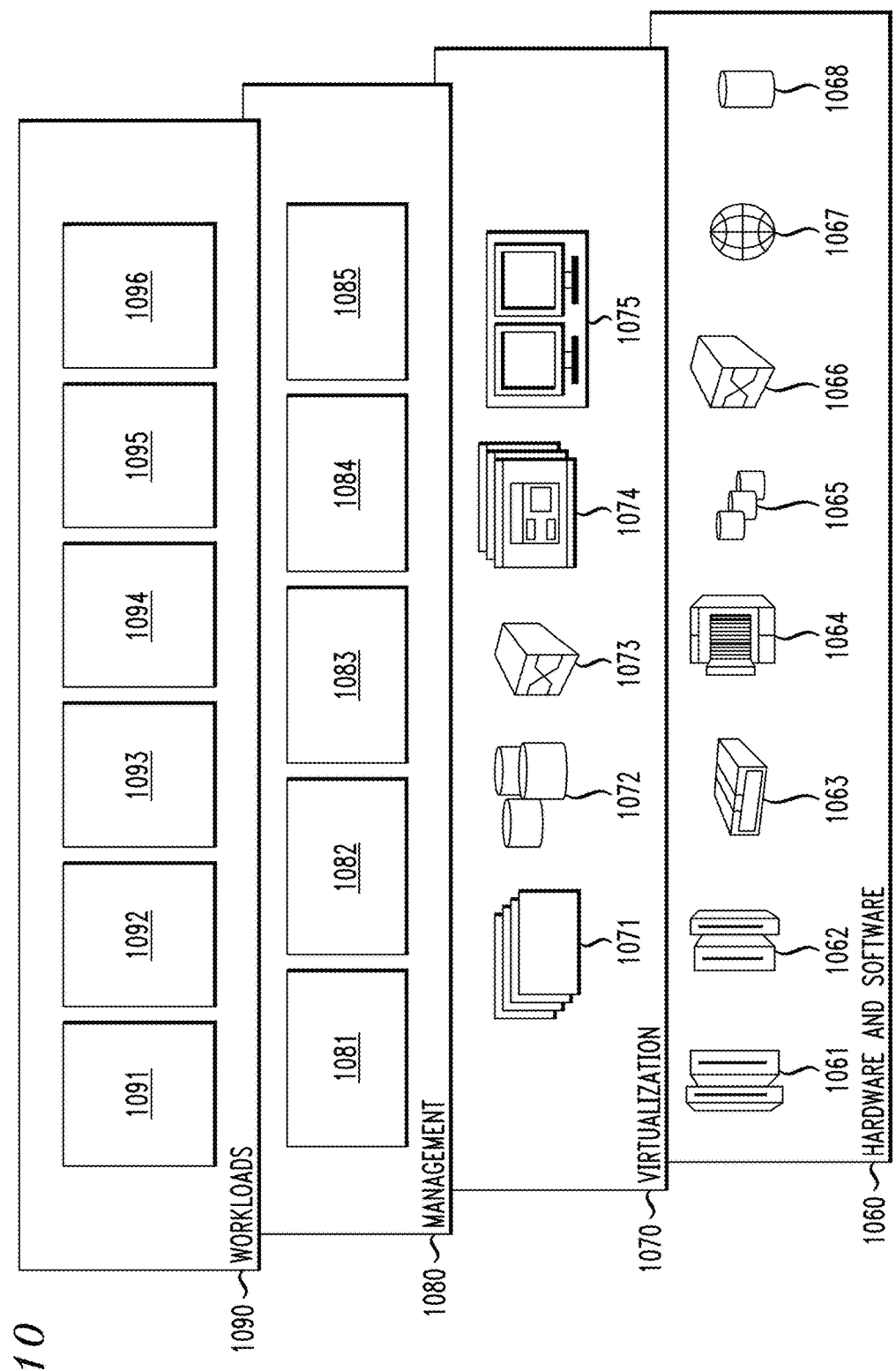
FIG. 10 depicts abstraction model layers, according to an embodiment of the present invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and SAGD mixed integer non-linear optimization 1096, which may perform various functions described above with respect to SAGD mixed integer non-linear optimization system 102.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for controlling operation of a steam-assisted gravity drainage (SAGD) oil well system to increase efficiency in emulsion production comprising:
    obtaining a predictive model of the SAGD oil well system, the predictive model comprising control parameters including one or more continuous control parameters and one or more discrete control parameters;
    utilizing the predictive model to determine values for the control parameters that meet one or more objectives for the SAGD oil well system subject to one or more constraints based on a sequence of iterations of solving a mixed integer non-linear problem;
    adjusting controls of the SAGD oil well system based on the determined values of the control parameters;
    collecting data from a plurality of sensors in the SAGD oil well system while operating the SAGD oil well system utilizing the adjusted controls; and
    refining the predictive model of the SAGD oil well system utilizing the collected data from the plurality of sensors in the SAGD oil well system;
    wherein the discrete control parameters comprise one or more binary variables, the one or more binary variables controlling at least one of:
        whether to operate or shut down a given one of a plurality of SAGD oil wells at a given SAGD production site of the SAGD oil well system; and
        whether to open or close a valve that allocates steam to an injector well at the given SAGD oil well at the given SAGD production site in the SAGD oil well system; and
    wherein the method is performed by at least one processing device comprising a processor coupled to a memory, the processing device being operatively coupled to the SAGD oil well system.

2. The method of claim 1, wherein determining values for the control parameters comprises identifying values for the control parameters that improve the one or more objectives for the SAGD oil well system while maintaining specified bounds on observables and the controls of the SAGD oil well system.

3. The method of claim 2, wherein relationships between the one or more objectives and the controls of the SAGD oil well system are non-linear.

4. The method of claim 2, wherein relationships between the one or more constraints on the observables and the controls of the SAGD oil well system are non-linear.

5. The method of claim 1, further comprising:
    obtaining the predictive model of the SAGD oil well system by generating the predictive model of the SAGD oil well system; and
    calibrating the predictive model utilizing historical time series data relating to one or more SAGD oil wells at one or more SAGD production sites of the SAGD oil well system, the historical time series data being obtained from the plurality of sensors in the SAGD oil well system.

6. The method of claim 1, wherein the discrete control parameters comprise a plurality of binary variables controlling whether to operate or shut down respective ones of a plurality of SAGD oil wells at one or more SAGD production sites of the SAGD oil well system.

7. The method of claim 1, wherein the discrete control parameters comprise a plurality of binary variables controlling whether to open or close respective ones of a plurality of valves that allocate steam to a plurality of injector wells at a plurality of SAGD oil wells at one or more SAGD production sites of the SAGD oil well system.

8. The method of claim 1, wherein:
    the discrete control parameters comprise a set of control variables specifying whether to operate or shut down each of a plurality of SAGD oil wells in the SAGD oil well system;
    the one or more constraints specify at least one upper bound on a number of SAGD oil wells that can be shut down in the SAGD oil well system at a given time; and
    the continuous control parameters comprise, for each SAGD oil well that is operated, a rate of steam allocated to that SAGD oil well.

9. The method of claim 1, wherein the continuous control parameters comprise two or more of:
    a heel steam rate at the given injector well at the given SAGD oil well in the SAGD oil well system;
    a toe steam rate at the given injector well;
    a heel lift gas flow at the given injector well;
    a toe lift gas flow at the given injector well; and
    an emulsion pressure at a given producer well at the given SAGD oil well.

10. The method of claim 9, wherein the one or more constraints comprise bound constraints specifying two or more of:
    a lower bound and an upper bound for a steam injection surface pressure for the given injector well;
    a lower bound and an upper bound for the heel steam rate based on historical heel steam rates for the given injector well;
    a lower bound and an upper bound for the toe steam rate based on historical toe steam rates for the given injector well;

a lower bound and an upper bound for casing gas pressure at the given SAGD oil well based on historical casing gas pressure for the given SAGD oil well; and a lower bound and an upper bound for emulsion pressure at the given producer well based on historical emulsion pressure at the given producer well.

11. The method of claim 9, wherein the one or more constraints comprise inequality constraints specifying two or more of:
at least one threshold pressure associated with the given SAGD oil well;
at least one threshold temperature associated with the given SAGD oil well; and
a threshold sub-cool level associated with the given SAGD oil well.

12. The method of claim 1, wherein the sequence of iterations comprises searching a solution space of a mixed integer non-linear problem comprising, in each iteration:
relaxation of the discrete control parameters as continuous variables and forming a first non-linear optimization problem incorporating the relaxed discrete control parameters;
building a surrogate model of the SAGD oil well system based on the first non-linear optimization problem;
finding optimal values for the surrogate model within a trust region of the surrogate model while accounting for the one or more constraints on the SAGD oil well system;
applying a discrete search utilizing integer programming to identify values for the discrete control parameters; and
utilizing non-linear programming to identify values for the control parameters using the first non-linear optimization problem wherein values for the discrete control parameters are kept fixed at the values identified by applying the discrete search.

13. The method of claim 12, wherein building the surrogate model comprises forming the surrogate model based upon curvature information where the predictive model is differentiable with respect to the control parameters and based on function values where the predictive model is not differentiable.

14. The method of claim 12, wherein building the surrogate model comprises forming the surrogate model based on one or more function evaluations at sample points representing values for the control parameters while monitoring the geometric suitability of the sample points.

15. The method of claim 14, wherein the one or more function evaluations are performed using a black box optimizer comprising a nonlinear autoregressive neural network trained using historical time series data for the SAGD oil well system obtained from the plurality of sensors in the SAGD oil well system.

16. The method of claim 12, wherein applying the discrete search utilizing the integer programming comprises utilizing one or more of outer approximation, branch and bound and feasibility pumps and cuts to explore improved values for the discrete control parameters.

17. The method of claim 12, wherein identifying values for the continuous control parameters utilizing the non-linear programming comprises solving a surrogate nonlinear programming problem posed as a quadratic.

18. The method of claim 1, wherein the one or more objectives comprise at least one of:
increasing emulsion production in the SAGD oil well system;
decreasing a steam to oil ratio for the SAGD oil well system; and
increasing a net present value of the SAGD oil well system.

19. A computer program product for controlling operation of a steam-assisted gravity drainage (SAGD) oil well system to increase efficiency in emulsion production comprising a computer readable storage medium for storing computer readable program code which, when executed, causes a computer:
to obtain a predictive model of the SAGD oil well system, the predictive model comprising control parameters including one or more continuous control parameters and one or more discrete control parameters;
to utilize the predictive model to determine values for the control parameters that meet one or more objectives for the SAGD oil well system subject to one or more constraints based on a sequence of iterations of solving a mixed integer non-linear problem;
to adjust controls of the SAGD oil well system based on the determined values of the control parameters;
to collect data from a plurality of sensors in the SAGD oil well system while operating the SAGD oil well system utilizing the adjusted controls; and
to refine the predictive model of the SAGD oil well system utilizing the collected data from the plurality of sensors in the SAGD oil well system;
wherein the discrete control parameters comprise one or more binary variables, the one or more binary variables controlling at least one of:
whether to operate or shut down a given one of a plurality of SAGD oil wells at a given SAGD production site of the SAGD oil well system; and
whether to open or close a valve that allocates steam to an injector well at the given SAGD oil well at the given SAGD production site in the SAGD oil well system.

20. An apparatus for controlling operation of a steam-assisted gravity drainage (SAGD) oil well system to increase efficiency in emulsion production comprising:
a memory; and
a processor coupled to the memory and configured:
to obtain a predictive model of the SAGD oil well system, the predictive model comprising control parameters including one or more continuous control parameters and one or more discrete control parameters;
to utilize the predictive model to determine values for the control parameters that meet one or more objectives for the SAGD oil well system subject to one or more constraints based on a sequence of iterations of solving a mixed integer non-linear problem;
to adjust controls of the SAGD oil well system based on the determined values of the control parameters;
to collect data from a plurality of sensors in the SAGD oil well system while operating the SAGD oil well system utilizing the adjusted controls; and
to refine the predictive model of the SAGD oil well system utilizing the collected data from the plurality of sensors in the SAGD oil well system;
wherein the discrete control parameters comprise one or more binary variables, the one or more binary variables controlling at least one of:
whether to operate or shut down a given one of a plurality of SAGD oil wells at a given SAGD production site of the SAGD oil well system; and whether to open or close a valve that allocates steam to an injector well at the given SAGD oil well at the given SAGD production site in the SAGD oil well system.

* * * * *